US012705315B2

(12) United States Patent
Srour et al.

(10) Patent No.: US 12,705,315 B2
(45) **Date of Patent: *Aug. 11, 2026**

(54) UTILIZING VIDEO AND INPUT PIPELINES TO PROTECT VIRTUAL DESKTOP INFRASTRUCTURE SESSIONS

(71) Applicant: Microsoft Technology Licensing, LLC, Redmond, WA (US)

(72) Inventors: Orr Srour, Ramat-Hasharon (IL); Ori Laslo, Rehovot (IL); Ashish Gupta, Fremont, CA (US); Vadim Makhervaks, Bellevue, WA (US); Andrew Lee Jenks, Woodinville, WA (US); Samuel John Wenker, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/194,978

(22) Filed: Apr. 3, 2023

(65) Prior Publication Data

US 2024/0265071 A1 Aug. 8, 2024

Related U.S. Application Data

(60) Provisional application No. 63/483,484, filed on Feb. 6, 2023.

(51) Int. Cl.
*G06F 21/10* (2013.01)
*G06F 9/451* (2018.01)
*G06F 9/455* (2018.01)

(52) U.S. Cl.
CPC ...... *G06F 21/1085* (2023.08); *G06F 9/45533* (2013.01); *G06F 9/452* (2018.02);
(Continued)

(58) Field of Classification Search
CPC . G06F 9/542; G06F 9/452; G06F 2009/45587
See application file for complete search history.

(56) References Cited

U.S. PATENT DOCUMENTS 8,966,581 B1 * 2/2015 Gross ...................... G06F 21/34 726/4
2002/0006202 A1 * 1/2002 Fruehauf ............... H04L 9/0894 380/260
(Continued)

FOREIGN PATENT DOCUMENTS

EP 3010199 A1 * 4/2016 ........... H04L 63/061

OTHER PUBLICATIONS

Huang, et al., "Proxy-based Security Audit System for Remote Desktop Access", in 2009 Proceedings of 18th International Conference on Computer Communications and Networks, pp. 1-5.
(Continued)

*Primary Examiner* — William R Korzuch
*Assistant Examiner* — Aditya Sriram
(74) *Attorney, Agent, or Firm* — Workman Nydegger

(57) ABSTRACT

Methods and systems are described which facilitate protecting a virtual desktop infrastructure (VDI) session. A first communication channel is established between a first cryptographic element and a VDI service. The first cryptographic element decrypts a video stream from the VDI service and overlays the decrypted video stream on a user's display. A second communication channel is established between a second cryptographic element and the VDI service. The second cryptographic element encrypts input received at a user's input device and sends the encrypted input to the cloud VDI service.

18 Claims, 6 Drawing Sheets

(52) U.S. Cl.
CPC .............. *G06F 2009/45583* (2013.01); *G06F 2009/45587* (2013.01); *G06F 21/107* (2023.08)

(56) References Cited

U.S. PATENT DOCUMENTS

| | | | | |
|---|---|---|---|---|
| 2007/0101435 | A1* | 5/2007 | Konanka | G06F 21/57 713/193 |
| 2009/0245521 | A1 | 10/2009 | Vembu | |
| 2012/0233549 | A1 | 9/2012 | Ricci | |
| 2013/0227668 | A1* | 8/2013 | Mocanu | H04L 63/0823 726/8 |
| 2014/0245194 | A1* | 8/2014 | Wright | G06F 3/1423 715/761 |
| 2018/0234390 | A1* | 8/2018 | Camiel | G06F 9/452 |
| 2021/0263759 | A1* | 8/2021 | Pascual | H04L 9/3263 |
| 2022/0103536 | A1* | 3/2022 | Kida | H04L 63/0485 |
| 2025/0053669 | A1* | 2/2025 | Soffer | G06F 21/606 |

OTHER PUBLICATIONS

International Search Report and Written Opinion received for PCT Application No. PCT/US2024/013630, Apr. 30, 2024, 16 pages.

Non-Final Office Action mailed on Dec. 10, 2024, in U.S. Appl. No. 18/295,227, 24 pages.

International Preliminary Report on Patentability Received for PCT Application No. PCT/US2024/013630, mailed on Aug. 21, 2025, 09 pages.

Final office action mailed on May 15, 2025, in U.S. Appl. No. 18/295,227, 21 pages.

U.S. Appl. No. 63/483,484, filed Feb. 6, 2023.

U.S. Appl. No. 18/295,227, filed Apr. 3, 2023.

Non-Final Office Action mailed on Oct. 20, 2025, in U.S. Appl. No. 18/295,227, 33 Pages.

Notice of Allowance mailed on Apr. 10, 2026, in U.S. Appl. No. 18/295,227, 18 Pages.

* cited by examiner

200

300

UTILIZING VIDEO AND INPUT PIPELINES TO PROTECT VIRTUAL DESKTOP INFRASTRUCTURE SESSIONS

CROSS-REFERENCE TO RELATED APPLICATIONS

This application claims priority to, and the benefit of, U.S. Provisional Application Ser. No. 63/483,484, filed Feb. 6, 2023, and entitled "UTILIZING VIDEO AND INPUT PIPELINES TO PROTECT VIRTUAL DESKTOP INFRASTRUCTURE SESSIONS," the entire contents of which are incorporated by reference herein in their entirety.

BACKGROUND

There is an ever-growing need for protecting computer resources, including data, from malicious actors. Previous solutions have included using cloud services to remotely provide cloud resources (e.g., services, remote applications, data storage) to edge computing devices (e.g., end-user devices). This enables the cloud resources to be centrally managed and protected by experts operating a cloud service. However, as more sophisticated cloud security solutions have been implemented, more sophisticated attacks to access cloud resources have followed. An example is using compromised edge computing devices to indirectly access cloud resources. For example, a malicious actor may compromise an edge computing device (e.g., using a stolen credential, via malware, via exploit of a software vulnerability), and then use that compromised edge computing device to monitor a user's interactions with a cloud resource. More particularly, a malicious actor may be able to intercept information displayed at a compromised edge computing device (e.g., to view a cloud resource as it is presented at an edge computing device display) and/or a malicious actor may be able to intercept user inputs at a compromised edge computing device (e.g., to view keystrokes, mouse movements, or other inputs provided to a cloud service).

As such, there is an ongoing need to access cloud resources (e.g., services, remote applications, data storage) securely from edge computing devices, even in the instance of a malicious attack of an edge computing device that access that cloud resource.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to a method, implemented at a computer system that includes a processing system, for protecting a virtual desktop infrastructure (VDI) session, including: establishing a first communication channel between a first cryptographic element and a cloud VDI service that provides remote access to a virtual service, the first cryptographic element being inaccessible by an operating system (OS) that executes at the processing system; at the first cryptographic element, decrypting a video stream that is received from the cloud VDI service and that corresponds to a first display output of the virtual service into a decrypted video stream; and overlaying the decrypted video stream over a second display output of the OS associated with the computer system; establishing a second communication channel between a second cryptographic element and the cloud VDI service, the second cryptographic element being inaccessible by the OS associated with the computer system; and at the second cryptographic element, encrypting an input received from an input device associated with the computer system to generate an encrypted input; and sending the encrypted input to the cloud VDI service via the second communication channel as input to the virtual service.

In some aspects, the techniques described herein relate to a computer system including: a processing system; and a computer storage media that stores computer-executable instructions that are executable by the processing system to at least: establish a first communication channel between a first cryptographic element and a cloud VDI service that provides remote access to a virtual service, the first cryptographic element being inaccessible by an operating system (OS) that executes at the processing system; at the first cryptographic element, decrypt a video stream that is received from the cloud VDI service and that corresponds to a first display output of the virtual service into a decrypted video stream, wherein a second display output of an operating system (OS) associated with the computer system receives the decrypted video stream as an overlaid image on the second display output; establish a second communication channel between a second cryptographic element and the cloud VDI service, the second cryptographic element being inaccessible by the OS associated with the computer system; and at the second cryptographic element, encrypt an input received from an input device associated with the computer system to generate an encrypted input, wherein the cloud VDI service receives the encrypted input via the second communication channel as input to the virtual service.

In some aspects, the techniques described herein relate to a computer program product including a computer storage media that stores computer-executable instructions that are executable by a processor system to at least: establish a first communication channel between a first cryptographic element and a cloud VDI service that provides remote access to a virtual service, the first cryptographic element being inaccessible by an operating system (OS) that executes at the processing system; at the first cryptographic element, decrypt a video stream that is received from the cloud VDI service and that corresponds to a first display output of the virtual service into a decrypted video stream; and overlay the decrypted video stream over a second display output of the OS associated with a computer system; establish a second communication channel between a second cryptographic element and the cloud VDI service, the second cryptographic element being inaccessible by the OS associated with the computer system, wherein the second communication channel is cryptographically associated with the first communication channel; and at the second cryptographic element, encrypt an input received from an input device associated with the computer system to generate an encrypted input; and send the encrypted input to the cloud VDI service via the second communication channel as input to the virtual service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

As the number and sophistication of malicious attacks to get access to cloud resources have increased, the need to protect cloud resources against these malicious attacks has also grown. While storing data in a cloud, instead of on an edge computing device such as a personal computer, adds a first layer of protection, malicious actors have developed more sophisticated techniques to access cloud resources. These include using software, installed at a compromised edge computing device (e.g., an end-user's device), to monitor that device's display content and/or inputs. This software could be malware installed by a malicious actor, or even benign software (e.g., a remote display server) already available at the edge computing device. In this way, a malicious actor is capable of monitoring a remote virtual desktop infrastructure (VDI) session between the edge computing device and a cloud VDI host. For example, the malicious actor can gain access to cloud-secured data by monitoring a remote application or even an entire virtual desktop display received from the cloud VDI host and rendered at the edge computing device. Additionally, or alternatively, the malicious actor can gain access to a data submission by monitoring inputs (e.g., keystrokes, pointing device inputs, touch gestures, voice input) submitted to the cloud VDI host. Therefore, there is an ongoing need for other security measures when accessing resources stored in a cloud environment.

At least some embodiments described herein secure remote VDI sessions by utilizing a secured video pipeline and a secured input pipeline that are resistant to data leaks, even when an edge computing device participating in the VDI session has been compromised. Disclosed embodiments include security measures to 1) protect video streams received from the cloud from being intercepted while they are rendered for display at an edge computing device, even when the edge computing device is compromised; and 2) protect inputs intended to be transmitted by an edge computing device to the cloud from being intercepted at the edge computing device, even when the edge computing device has been compromised.

Figure 1:
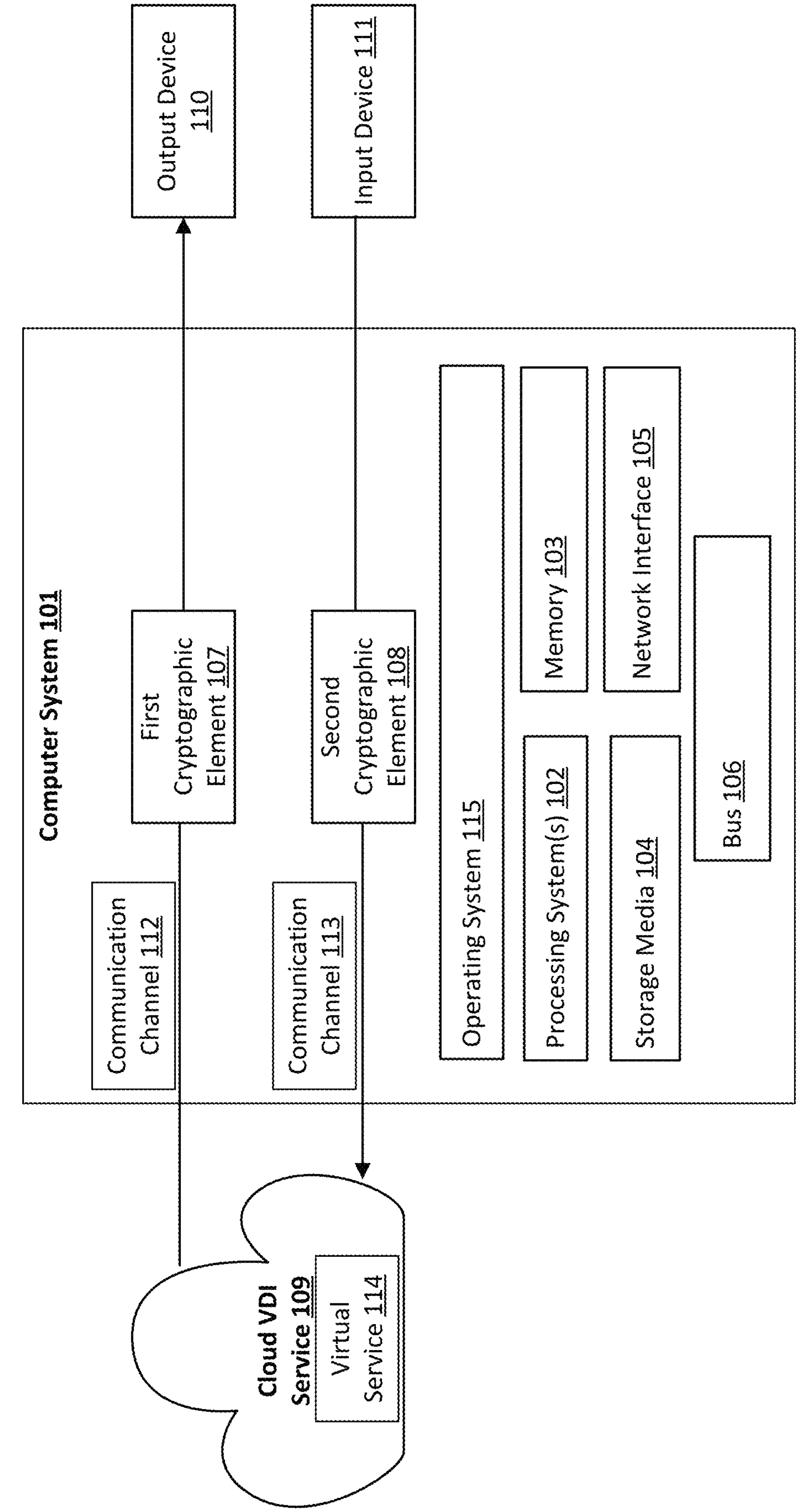
FIG. 1 illustrates an example computer architecture that facilitates securing virtual desktop infrastructure (VDI) sessions.

FIG. 1 illustrates an example computer architecture 100 that facilitates secure VDI sessions. As shown, computer architecture 100 includes a computer system 101 comprising processing system(s) 102 (e.g., a single processor, or a plurality of processors), memory 103 (e.g., system or main memory), storage media 104 (e.g., a single computer-readable storage medium, or a plurality of computer-readable storage media), all interconnected by a bus 106. Using at least processing system(s) 102, memory 103, and storage media 104, computer system 101 operates an operating system (OS) 115, and potentially one or more applications executing thereon.

As shown, in embodiments, computer system 101 also includes a network interface 105 (e.g., one or more network interface cards) for interconnecting, via a network (e.g., a wide area network (WAN), such as the Internet) to a cloud VDI service 109. Additionally, computer system 101 is connected to an output device 110 (e.g., a video display device, an audio device) and an input device 111 (e.g., a keyboard, a mouse, a trackpad, a touch-sensitive display layer, a microphone) either locally or remotely. As examples, in embodiments a local connection is a physical wired connection, a personal area network (PAN) connection such as a wireless connection (e.g., BLUETOOTH), or a local area network (LAN) connection such as a WIFI wireless connection. As an example, in embodiments a remote connection is a WAN connection.

In embodiments, cloud VDI service 109 hosts, and provides computer system 101 remote access to, a virtual service 114. In embodiments, virtual service 114 is an application (e.g., software as a service), a virtual machine (VM) (or a plurality of VMs), and/or the like. In embodiments, using a first cryptographic element 107, computer system 101 establishes a first communication channel 112 with cloud VDI service 109. In embodiments, using first communication channel 112, first cryptographic element 107 securely receives outputs generated by virtual service 114. In one example, first cryptographic element 107 receives a video stream comprising a visual output (e.g., an application, a console, a desktop environment) generated by virtual service 114. Additionally, or alternatively, in another example first cryptographic element 107 receives an audio stream comprising an audio output generated by virtual service 114. In some embodiments, a single audio/visual stream includes both visual and audio outputs.

In embodiments, first cryptographic element 107 decrypts a video stream that is received from cloud VDI service 109, and overlays that decrypted video stream on a display output of OS 115 (e.g., a desktop environment of OS 115) when that display output is shown on a display device (e.g., output device 110). In embodiments, decrypted data generated by first cryptographic element 107 is inaccessible by OS 115. Thus, even if computer system 101 is compromised, a malicious actor monitoring the display output of OS 115 is unable to view VDI output data, as it is overlayed by first cryptographic element 107 on the display output of OS 115. For example, a malicious actor may be able to view a desktop environment of OS 115 as generated by OS 115, but is unable to view the decrypted video stream that is overlayed by first cryptographic element 107 on the display output of OS 115.

In some embodiments, first cryptographic element 107 provides a visual indication of where a decrypted video stream is being overlayed on a display output of OS 115. In one example, first cryptographic element 107 overlays colored (e.g., red) lines around the outer edges of the decrypted video stream, creating a visual border between protected and non-protected visual content. In alternative embodiments, a visual indication is overlayed by the cloud VDI service 109 around a visual output of virtual service 114 prior to sending that visual output over first communication channel 112.

In embodiments, first cryptographic element 107 also decrypts an audio stream received from cloud VDI service 109, and routes the decrypted audio data to an audio output device (e.g., output device 110). In embodiments, because the data generated by first cryptographic element 107 is inaccessible by OS 115, even if computer system 101 is compromised, a malicious actor is unable to access this decrypted audio data.

As mentioned, in embodiments, decrypted data generated by first cryptographic element 107 is inaccessible by OS 115. In some embodiments, this is accomplished using digital rights management (DRM) technology incorporated into processing system(s) 102. Thus, in some examples, first cryptographic element 107 is a DRM component that implements, as examples, MICROSOFT PLAYREADY, ADOBE PRIMETIME, APPLE FAIRPLAY STREAMING, GOOGLE WIDEVINE, DIVX, INTERTRUST MARLIN, VERAMATRIX VCAS, and the like. DRM technology has conventionally used encryption of video and/or audio streams to manage legal access to digital content. However, using DRM technology to protect the audio/visual output of VDI sessions, first cryptographic element 107 uses DRM techniques that have conventionally been used manage legal access to digital content to instead protect data stored at cloud VDI service 109 from being accessed by malicious actors using compromised edge devices.

In embodiments, using a second cryptographic element 108, computer system 101 also establishes a second communication channel 113 with cloud VDI service 109. In some embodiments, the second cryptographic element 108 is an inputs protection component. Similar to first cryptographic element 107, in embodiments, second cryptographic element 108 is also inaccessible by OS 115 and/or processing system(s) 102. In embodiments, second cryptographic element 108 encrypts input received from input device 111. In some embodiments, input device 111 is a keyboard, mouse, microphone, virtual reality headset, or other appropriate input devices. In some embodiments, inputs are received from multiple input devices. In embodiments, second cryptographic element 108 securely sends encrypted input to cloud VDI service 109 via second communication channel 113 as input to virtual service 114.

In embodiments, first communication channel 112 and second communication channel 113 are cryptographically associated with one another. In some embodiments, cryptographically associating these channels is accomplished based on the presence of a common cryptographic credential at each of first cryptographic element 107 and second cryptographic element 108. In embodiments, a cryptographic credential can be an encryption key (e.g., an attestation key, the public key of an asymmetric key pair), a signed identity, a certificate (e.g., an attestation certificate), and/or the like. In some embodiments, the common cryptographic credential is stored at first cryptographic element 107 and second cryptographic element 108 during provisioning of those components (e.g., during device manufacture). In other embodiments, the common cryptographic credential is sent (e.g., over a network) to first cryptographic element 107 and second cryptographic element 108 after provisioning. In yet other embodiments, the common cryptographic credential is manually added (e.g., by an end-user) to first cryptographic element 107 and second cryptographic element 108 after provisioning.

In embodiments, cloud VDI service 109 verifies that first communication channel 112 is cryptographically associated with second communication channel 113 prior to sending outputs (e.g., video stream, audio stream) of virtual service 114 over first communication channel 112. In doing so, cloud VDI service 109 ensures that first communication channel 112 and second communication channel 113 belong to the same physical edge computing device, and session. In embodiments, if first communication channel 112 is not cryptographically associated with second communication channel 113, cloud VDI service 109 does not send outputs of virtual service 114 over first communication channel 112. By sending outputs of virtual service 114 over first communication channel 112 only when second communication channel 113 is verified to be cryptographically associated with second communication channel 113, cloud VDI service 109 ensures that it only shares cloud resources (e.g., application, VM console, desktop environment) when inputs requesting that data are authenticated.

Figure 2:
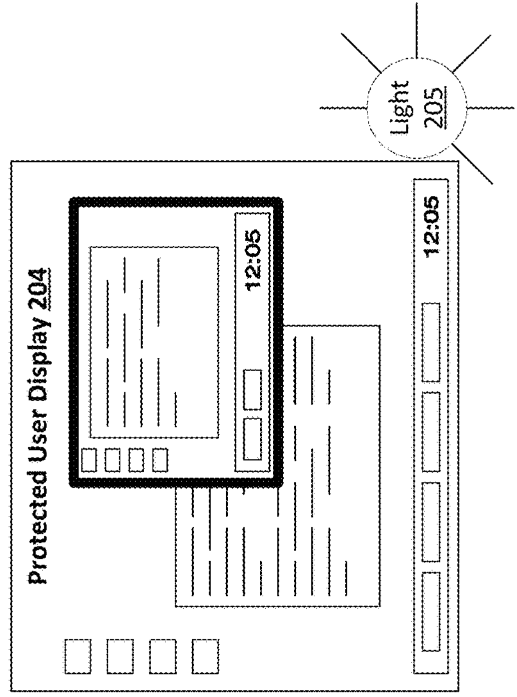
FIG. 2 illustrates an example protected and unprotected display from the perspective of a user and a malicious actor.
Figure 2:
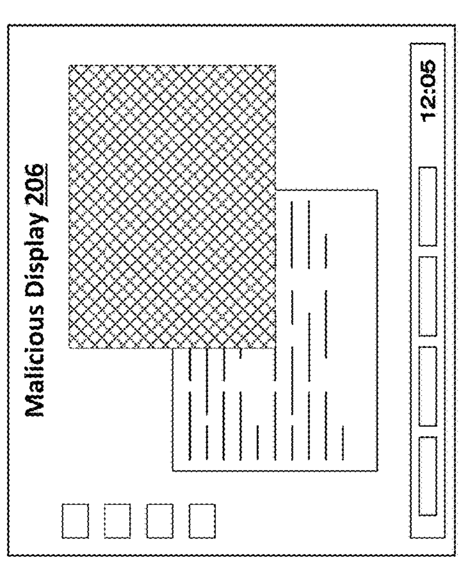
Figure 2:
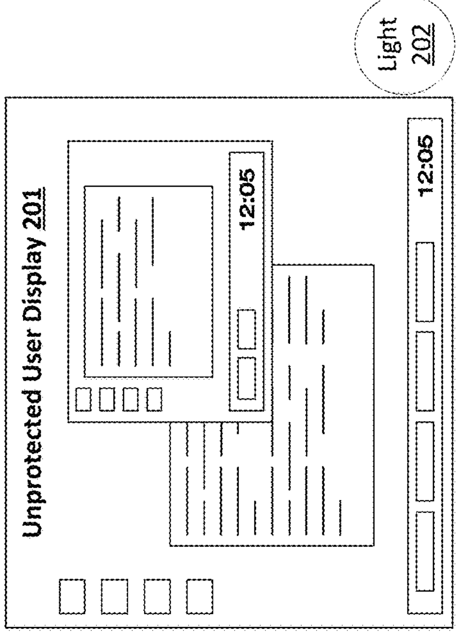
Figure 2:
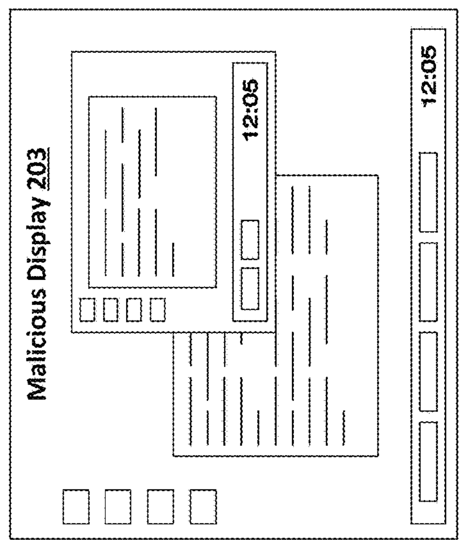

Referring now to FIG. 2 and example 200, in some embodiments, an indicator is visible to the user when the display is in a protected session. For example, in the case when the system is unprotected, the user is shown an unprotected user display 201 and a malicious actor may be able to intercept and view that user display 201, as shown by malicious display 203. As shown in FIG. 2, all the content shown on the unprotected user display 201 is also shown on the malicious display 203.

In embodiments where the stream is protected, a protected user display 204 has a visible indicator, indicating a portion of the displayed content that is protected. For example, the visible indicator may appear on the protected user display 204 as a bolded or colored box around the protected content. In some embodiments, the protected user display 204 may include text on the screen saying "protected," "secure," or other appropriate text to indicate the session is protected. In yet other embodiments, the device may include a physical indicator (e.g., a light). When the session is unprotected, the light 202 is turned off and when the session is protected, the light 205 is turned on. In some embodiments, multiple indicators, such as a bolded box and a light, may be present to indicate the session is protected. Regardless of the form of the indicator, in embodiments display of the indicator is controlled by a component that is isolated from OS 115 (e.g., first cryptographic element 107). In embodiments, control of the indicator by a component that is isolated from OS 115 prevents the indicator from being spoofed or captured by malicious software executing at OS 115.

Referring now to the malicious display 206, when the user display is protected (e.g., protected user display 204), the malicious actor is unable to view the protected content. For example, as shown in malicious display 206, the malicious actor may see a box that covers a protected portion of the user display, or even the entire user display. Other embodiments may blur protected content, substitute protected content with dummy content, etc.

Figure 3:
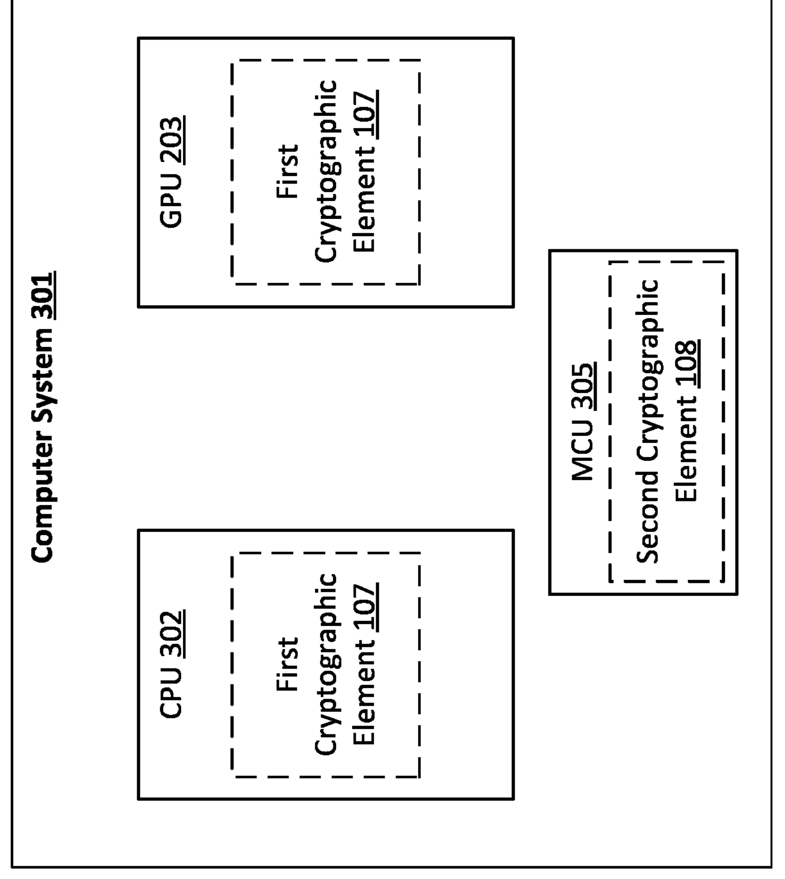
FIG. 3 illustrates an example of placement of cryptographic elements within a computer architecture.

Referring now to FIG. 3, the first cryptographic element 107 is part of a central processing unit (CPU) (e.g., processing system(s) 102). Thus, in example 300, first cryptographic element 107 is illustrated as being located at a CPU 302 of computer system 301. In some embodiments, first cryptographic element 107 is located in an enclaved portion of CPU 302, such that decrypted data generated by first cryptographic element 107 is inaccessible to the rest of CPU 302 (and an OS executing thereon, such as OS 115). Additionally, or alternatively, in embodiments first cryptographic element 107 is part of a graphics processing unit (GPU) (e.g., processing system(s) 102). Thus, in example 300, first cryptographic element 107 is additionally, or alternatively, located on a GPU 303 of computer system 301. In embodiments, by locating first cryptographic element 107 at least partially on GPU 303, memory used by first cryptographic element 107 is inaccessible to CPU 302 (and an OS executing thereon, such as OS 115).

Referring also to FIG. 3, in embodiments, second cryptographic element 108 is part of a microcontroller unit (MCU) 305, such as an input controller. Thus, in example 300, second cryptographic element 108 is illustrated as being located on an MCU 305 of computer system 301. In embodiments, MCU 305 receives inputs from input device(s) (e.g., input device 111) prior to those inputs reaching a CPU (e.g., processing system(s) 102). In embodiments, second cryptographic element 108 encrypts those inputs, and MCU 305 then passes these encrypted inputs to the CPU (e.g., processing system(s) 102), or sends the encrypted inputs directly over second communication channel 113 to cloud VDI service 109. Either way, by encrypting inputs, MCU 305 prevents those inputs from being accessible to an OS at computer system 301 (e.g., OS 115) and/or to CPU 302.

Figure 4:
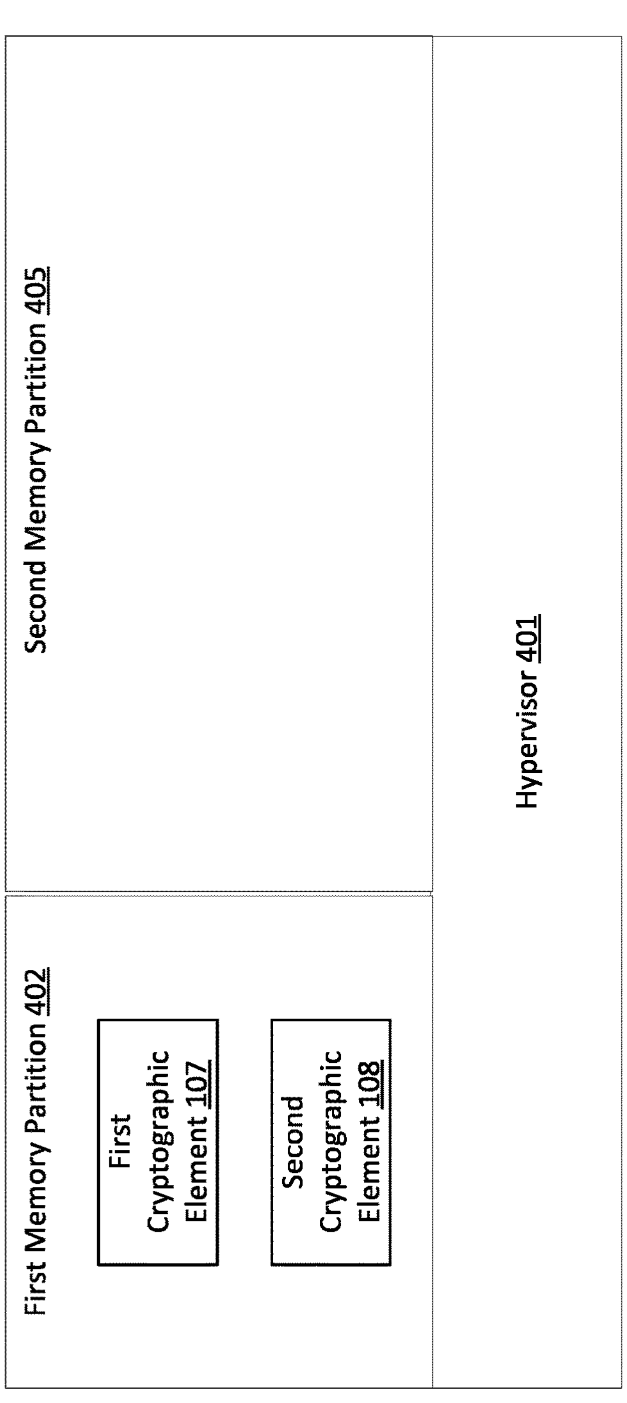
FIG. 4 illustrates an example of partitioned memory within a computer system.

Referring now to FIG. 4 and example 400, in some embodiments, first cryptographic element 107 and/or second cryptographic element 108 is a software component that executes at processing system(s) 102, but which is memory-isolated from OS 115 using virtualization technology. For example, in example 400, first cryptographic element 107 and/or second cryptographic element 108 execute within a first memory partition 402 that is isolated from a second memory partition 405. In embodiments, first memory partition 402 and second memory partition 405 are created using a hypervisor 401, such as HYPER-V from MICROSOFT, VMWARE, KVM, and the like. In embodiments, OS 115 executes within second memory partition 405, and thus first cryptographic element 107 and/or second cryptographic element 108 are isolated from, and inaccessible by, OS 115.

Figure 5:
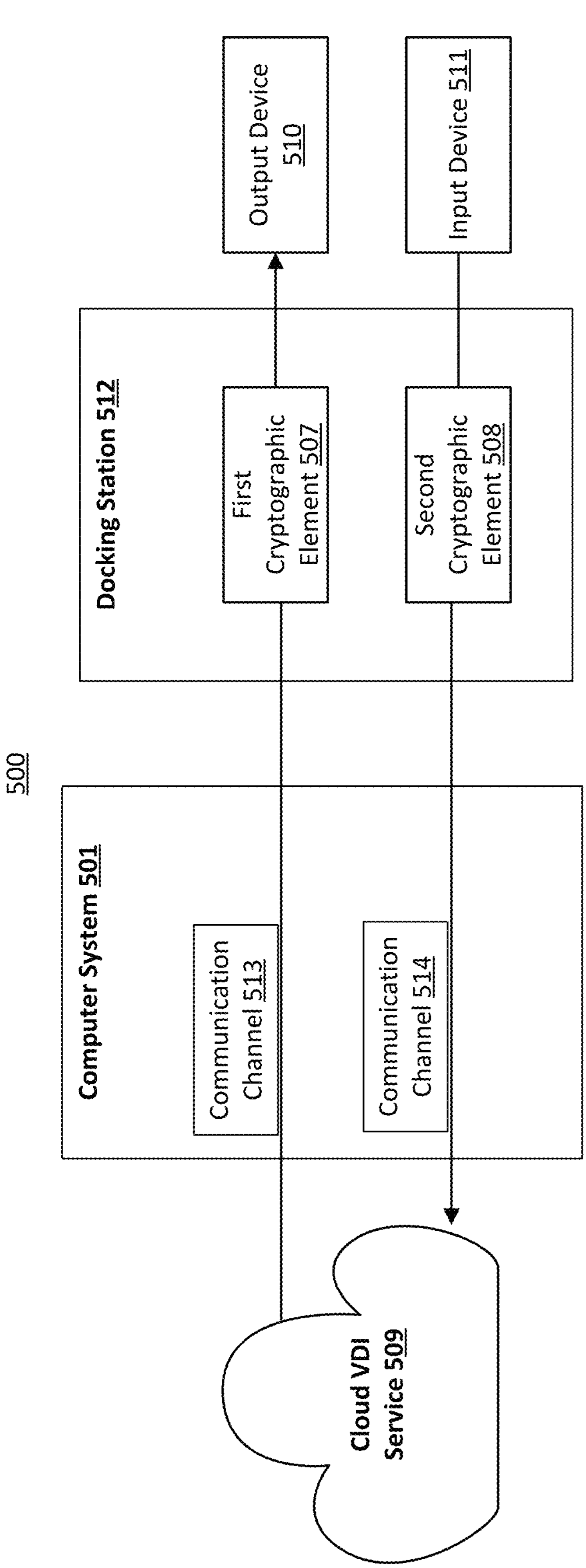
FIG. 5 illustrates an example of a docking station within the computer architecture.

While, in FIGS. 1, 3, and 4, the first cryptographic element and the second cryptographic element are illustrated as part of an edge computing device (e.g., computer system 101), in some embodiments these cryptographic elements are separate from computer system 101. Referring now to FIG. 5 and example 500, in some embodiments a first cryptographic element 507 and a second cryptographic element 508 are located at a docking station 512. In example 500, docking station 512 is positioned between a computer system 501 (e.g., an edge computing device) and an output device 510 and an input device 511 used in connection with computer system 501. In example 500, a first communication channel 513 and a second communication channel 514 are established by these cryptographic elements at docking station 512, rather than at computer system 501, potentially leveraging networking hardware at computer system 501. In embodiments, first cryptographic element 507 receives both 1) VDI output (e.g., audio and/or video) from a cloud VDI service 509 via first communication channel 513 and 2) output of computer system 501 (e.g., audio and/or video), and overlays the VDI output over the output of computer system 501 prior to sending that composite output to output device 510 (e.g., a display, audio hardware). In embodiments, second cryptographic element 508 receives inputs from input device 511, encrypts those inputs, and sends them over second communication channel 514. In some embodiments, docking station 512 provides a visual (e.g., a light) and/or audible indicator when it is performing one, or both, of these functions. Thus, in embodiments, a local physical indication denotes the security state of the system (e.g., while in secure mode).

Figure 6:
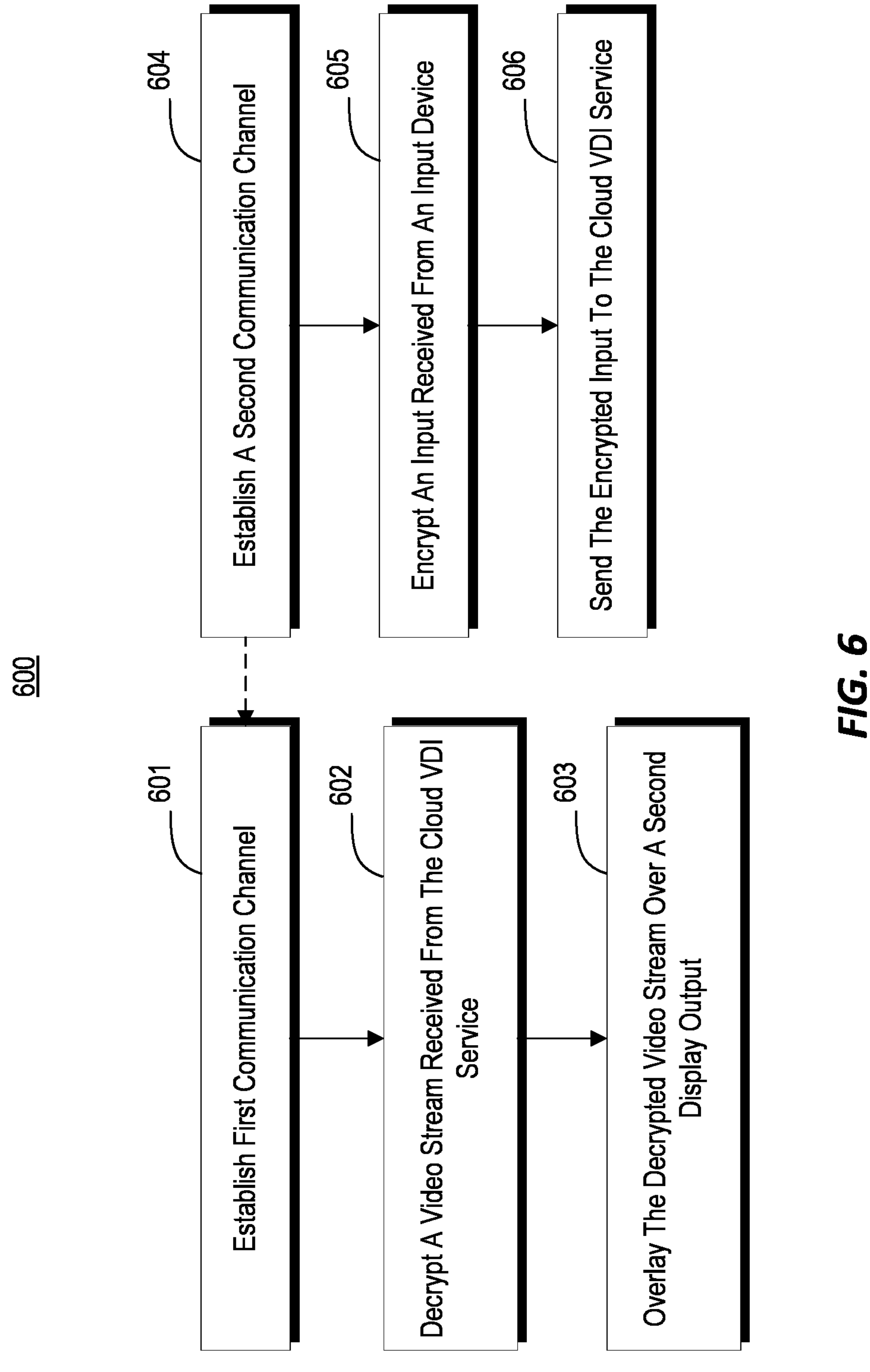
FIG. 6 illustrates a flow chart of an example method for actions to secure a VDI session.

FIG. 6 illustrates a flow diagram of an example method 600, comprising acts that secure a VDI session. The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

At act 601 (establish first communication channel), a first communication channel 112 is established between first cryptographic element 107 and cloud VDI service 109. In embodiments, first communication channel 112 provides remote access to VDI outputs, such as a video display (e.g., application, console, desktop environment) and/or audio generated by virtual service 114. From the perspective of computer system 101, in some embodiments, act 601 comprises establishing a first communication channel between a first cryptographic element and a cloud VDI service that provides remote access to a virtual service, the first cryptographic element being inaccessible by an OS that executes at the processing system. In some embodiments, act 601 comprises establishing a first communication channel between a DRM component and a cloud VDI service that provides remote access to a virtual service, the DRM component being inaccessible by an OS that executes at the processing system.

At act 602 (decrypt a video stream received from the cloud VDI service), first cryptographic element 107 decrypts a video stream, which was received from cloud VDI service 109 and which corresponds to a first display output of the virtual service 114, into a decrypted video stream. In embodiments, act 602 comprises, at the first cryptographic element, decrypting a video stream that is received from the cloud VDI service and that corresponds to a first display output of the virtual service into a decrypted video stream.

At act 603 (overlay the decrypted video stream over a second display output), first cryptographic element 107 overlays the decrypted video stream over a second display output on a user's display device (e.g., output device 110), where the second display output is associated with computer system 101 (e.g., a desktop environment generated by OS 115). In some embodiments, act 603 comprises overlaying the decrypted video stream over a second display output of the OS associated with the computer system.

At act 604 (establish a second communication channel), second communication channel 113 is established between second cryptographic element 108 and cloud VDI service 109. In embodiments, act 604 comprises establishing a second communication channel between a second cryptographic element and the cloud VDI service, the second cryptographic element being inaccessible by the OS associated with the computer system. In some embodiments, act 604 comprises establishing a second communication channel between an inputs protection component and the cloud VDI service, the inputs protection component being inaccessible by the OS associated with the computer system.

At act 605 (encrypt an input received from an input device), second cryptographic element 108 encrypts an input received from a user's input device (e.g., input device 111). In embodiments, act 605 comprises, at the second cryptographic element, encrypting an input received from an input device associated with the computer system to generate an encrypted input.

At act 606 (send the encrypted input to the cloud VDI service), the encrypted input is sent to cloud VDI service 109 via second communication channel 113 as input to virtual service 114. In some embodiments, act 606 comprises sending the encrypted input to the cloud VDI service via the second communication channel as input to the virtual service.

Notably, in method 600, there is no ordering specified between acts 601-603 and acts 604-606. Thus, these groups of acts could be performed serially (in either order), or in parallel. As indicated by a broken arrow extending from act 604 to act 601, some embodiments establish second communication channel 113 (act 604) occurs prior to establishing first communication channel 112 (act 601). In some implementations, after establishing the second communication channel 113, that channel is used to send a cryptographic credential (e.g., the public key of a public/private key pair) to cloud VDI service 109. This enables cloud VDI service 109 to confirm presence of this cryptographic credential at first cryptographic element 107 prior to establishment of the first communication channel 112, and enables cloud VDI service 109 to ensure that first communication channel 112 is cryptographically associated with second communication channel 113.

Embodiments of the disclosure may comprise or utilize a special-purpose or general-purpose computer system (e.g., computer system 101) that includes computer hardware, such as, for example, one or more processors (e.g., processing system(s) 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors (processing systems), cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor system, for protecting a virtual desktop infrastructure (VDI) session, comprising:

establishing a first communication channel between an enclaved portion of the processor system and a cloud VDI service that provides remote access to a virtual service, the enclaved portion of the processor system being inaccessible by an operating system (OS) that executes at the computer system;

at the enclaved portion of the processor system, decrypting a video stream that is received from the cloud VDI service over the first communication channel and that corresponds to a first display output of the virtual service into a decrypted video stream;

overlaying the decrypted video stream over a second display output of the OS, wherein the decrypted video stream is inaccessible to the OS; and initiating display of a user interface indicator that the decrypted video stream is secure;

establishing a second communication channel between a microcontroller unit and the cloud VDI service, the microcontroller unit being inaccessible by the OS; and at the microcontroller unit, encrypting an input received from an input device associated with the computer system to generate an encrypted input; and sending the encrypted input to the cloud VDI service via the second communication channel as an input to the virtual service, wherein the first communication channel and the second communication channel are associated with a common cryptographic credential, and the cloud VDI service verifies that the first communication channel and the second communication channel are associated with the common cryptographic credential.

2. The method of claim 1, wherein the enclaved portion of the processor system is a digital rights management (DRM) processor.

3. The method of claim 1, wherein the processor system is a central processing unit (CPU).

4. The method of claim 1, wherein the processor system is a graphics processing unit (GPU).

5. The method of claim 1, wherein the processor system and the microcontroller unit are located on a docking station that is connected to user input/output devices.

6. The method of claim 1, wherein sending the encrypted input to the cloud VDI service via the second communication channel comprises the microcontroller unit passing the encrypted input to the processor system.

7. The method of claim 1, the common cryptographic credential being stored at the enclaved portion of the processor system and the microcontroller unit at provisioning of the enclaved portion of the processor system and the microcontroller unit.

8. The method of claim 1, wherein the cloud VDI service verifies that the first communication channel and the second communication channel are associated with the common cryptographic credential prior to sending the video stream over the first communication channel.

9. The method of claim 1, further comprising, at the enclaved portion of the processor system, decrypting an audio stream that is received from the cloud VDI service.

10. A computer system comprising:

a hardware processor comprising an enclaved portion, wherein the enclaved portion:

establishes a first communication channel with a cloud VDI service that provides remote access to a virtual service, the enclaved portion being inaccessible by an operating system (OS) that executes at the computer system;

decrypts a video stream that is received from the cloud VDI service over the first communication channel and that corresponds to a first display output of the virtual service into a decrypted video stream, wherein the decrypted video stream is inaccessible to the OS;

overlays the decrypted video stream over a second display output of the OS; and initiates display of a physical indicator that the decrypted video stream is secure; and a microcontroller unit that:

establishes a second communication channel with the cloud VDI service, the microcontroller unit being inaccessible by the OS;

encrypts an input received from an input device associated with the computer system to generate an encrypted input; and sends the encrypted input to the cloud VDI service via the second communication channel as an input to the virtual service, wherein the first communication channel and the second communication channel are associated with a common cryptographic credential, and the cloud VDI service verifies that the first communication channel and the second communication channel are associated with the common cryptographic credential.

11. The computer system of claim 10, wherein the enclaved portion also decrypts an audio stream that is received from the cloud VDI service.

12. The computer system of claim 10, wherein the enclaved portion is a digital rights management (DRM) processor.

13. The computer system of claim 10, wherein the processor is a central processing unit (CPU).

14. The computer system of claim 10, wherein the processor is a graphics processing unit (GPU).

15. The computer system of claim 10, wherein the processor and the microcontroller unit are located on a docking station that is connected to user input/output devices.

16. The computer system of claim 10, wherein sending the encrypted input to the cloud VDI service via the second communication channel comprises the microcontroller unit passing the encrypted input to the processor.

17. The computer system of claim 10, the common cryptographic credential being stored at the enclaved portion and the microcontroller unit at provisioning of the enclaved portion and the microcontroller unit.

18. The computer system of claim 10, wherein the cloud VDI service verifies that the first communication channel and the second communication channel are associated with the common cryptographic credential prior to sending the video stream over the first communication channel.

* * * * *